United States Patent
Oikawa

(10) Patent No.: US 6,813,410 B2
(45) Date of Patent: Nov. 2, 2004

(54) OPTICAL SWITCH FOR COMPENSATING FOR DEGRADATION OF OPTICAL-COUPLING CHARACTERISTIC

(75) Inventor: Yoichi Oikawa, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 70 days.

(21) Appl. No.: 09/986,027

(22) Filed: Nov. 7, 2001

(65) Prior Publication Data

US 2003/0012489 A1 Jan. 16, 2003

(30) Foreign Application Priority Data

Jul. 11, 2001 (JP) .......................................... 2001-211208

(51) Int. Cl.⁷ ................................................. G02B 6/26
(52) U.S. Cl. ............................. 385/18; 385/14; 385/16; 385/17; 385/19; 385/40
(58) Field of Search ................................ 385/18, 16–19, 385/14, 40; 359/212–214, 223, 225

(56) References Cited

U.S. PATENT DOCUMENTS 6,445,844 B1 * 9/2002 Neukermans et al. .......... 385/18
6,539,142 B2 * 3/2003 Lemoff et al. ................. 385/18

OTHER PUBLICATIONS

Kazuhiro Hane et al. "Development of Optical Communication Parts Using Micro–Machine Technology" vol. 23, No. 2 O plus E. pp. 210–215.
Yoshimutsu Kato "MEMS Optical Switch" vol. 23, No. 2 O plus E. pp. 222–227.

* cited by examiner

Primary Examiner—Audrey Chang
Assistant Examiner—Denise S. Allen
(74) Attorney, Agent, or Firm—Staas & Halsey LLP

(57) ABSTRACT

In an optical switch with a mirror, the inclination angle of which varies depending on an application voltage, a low-frequency signal is superimposed on the application voltage, and a low-frequency component is detected in output light reflected on the mirror. Then, an application voltage is increased/decreased based on the detected low-frequency component.

9 Claims, 15 Drawing Sheets

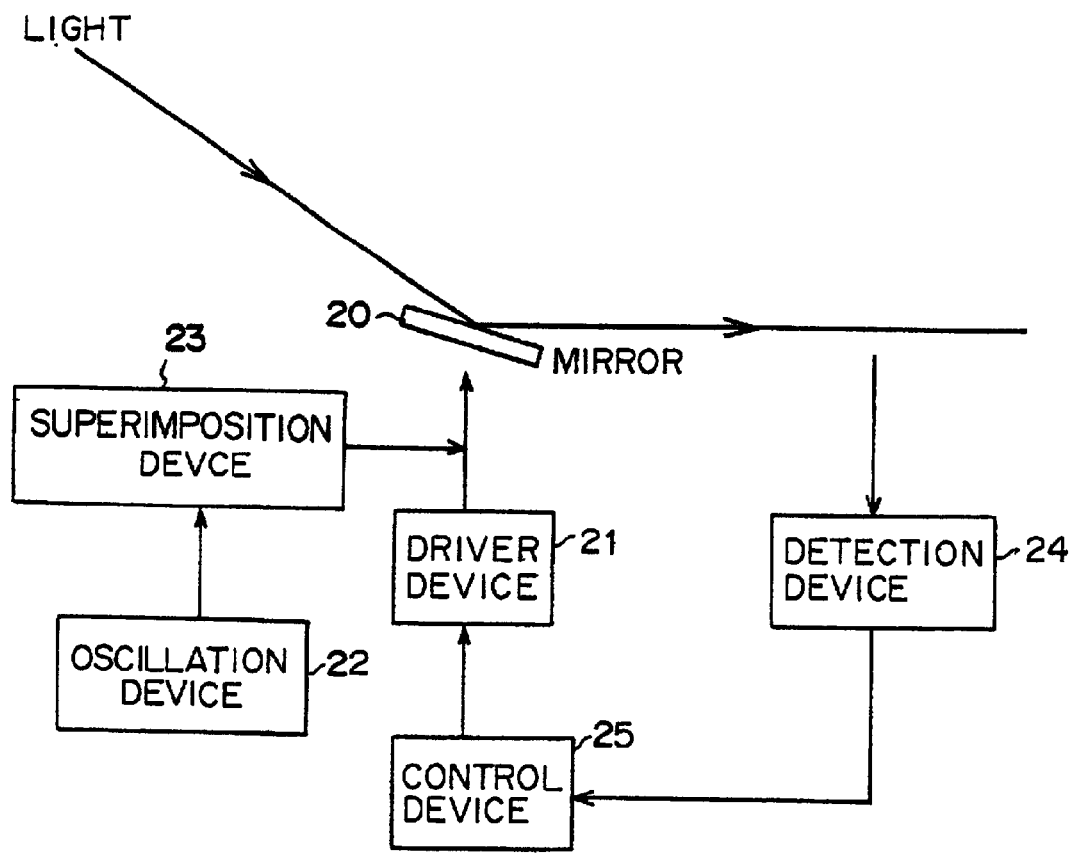
F I G. 2

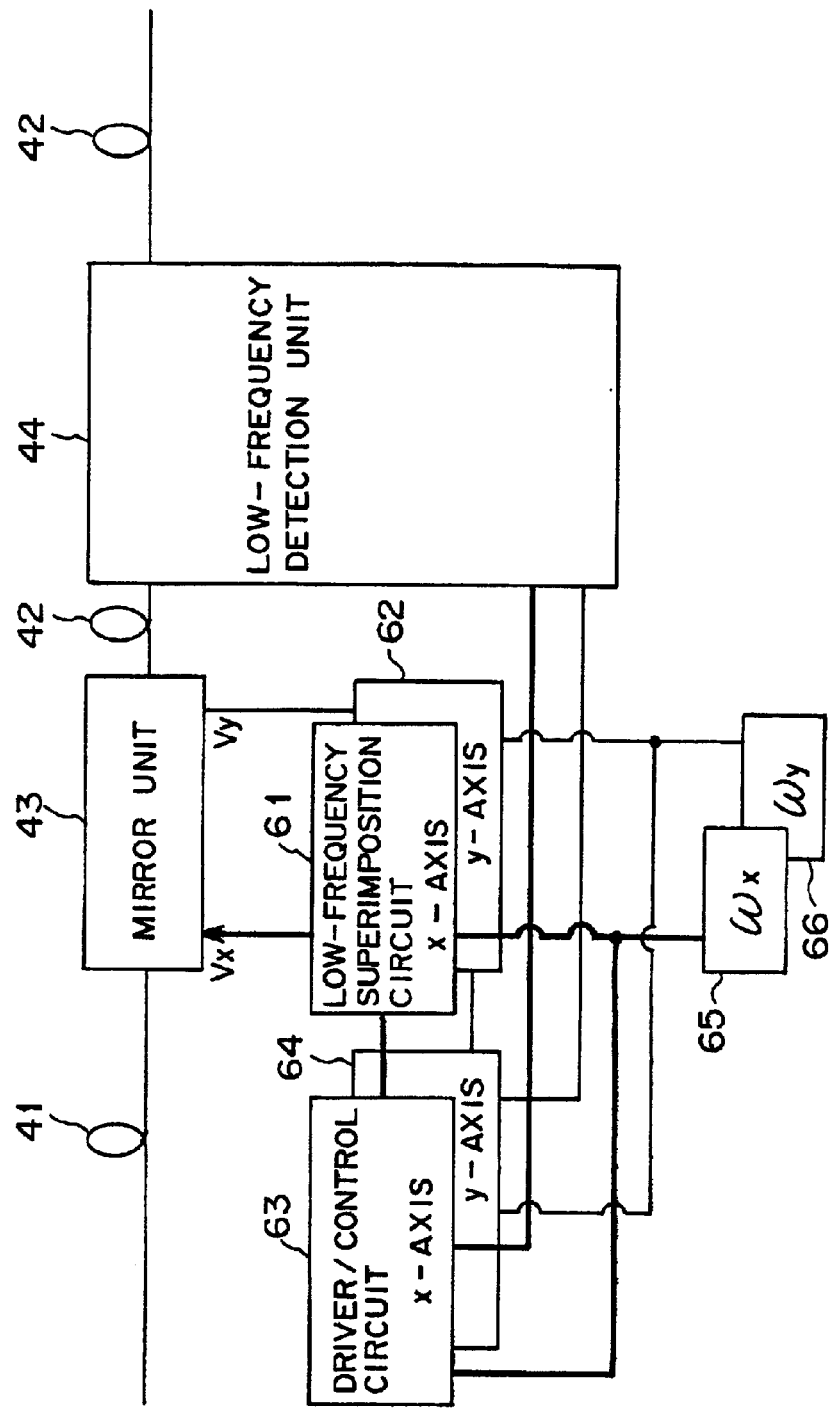
F I G. 7

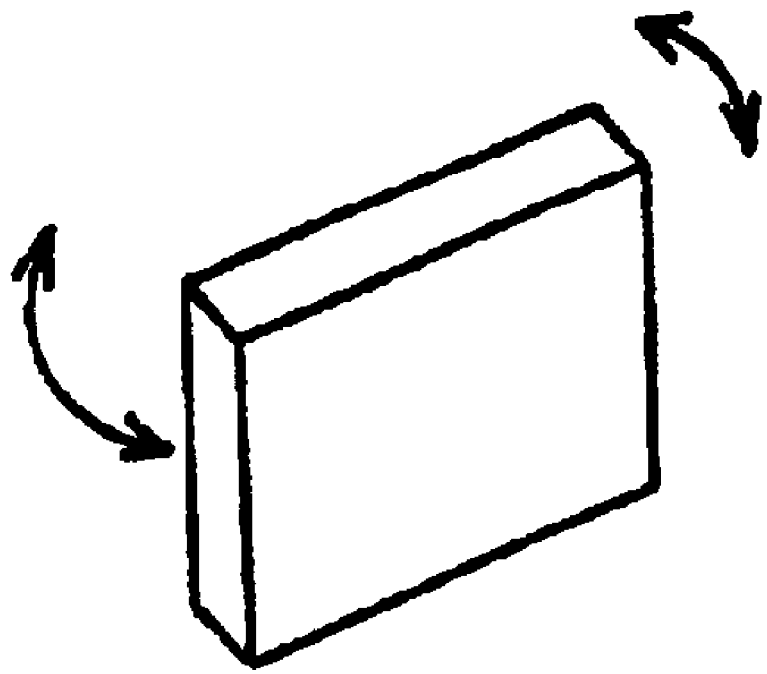
F I G. 12

OPTICAL SWITCH FOR COMPENSATING FOR DEGRADATION OF OPTICAL-COUPLING CHARACTERISTIC

BACKGROUND OF THE INVENTION

1. Field of the Invention

The present invention relates to an optical switch in a node device constituting a photonic network.

2. Description of the Related Art

A wavelength-division multiplexing (WDM) system is being developed and commercialized as a communications system for rapidly increasing the transmission capacity. To connect WDM systems and to organize a wide photonic network, a ring type network for connecting a plurality of devices in a loop shape is being studied. In this network, as the scale of a network is extended, a transmitting data amount in a loop is extremely increased. Thus, a mesh type network for connecting a plurality of devices in a mesh shape is also extensively studied.

The key technology of such a network organization is a large-scale optical switch for switching a lot of input/output fibers. In a ring type network or a point-to-point system, an electric switch is used to extract a low-order group signal from a node. By replacing this electric switch with an optical switch, cost of a node device can be reduced. Therefore, the implementation of a large-scale optical switch is a major issue in a variety of networks.

Most of currently commercialized optical switches are waveguide type small-scale switches and the switch is composed of an input/output fiber array and a switch element. To extend the scale of a switch element, the yield of a switch cell must be improved. However, since the dimensions tolerance in a manufacturing process is small, it is difficult to improve the yield.

Although an optical loss factor includes both loss in a switch cell and loss in a joint with an input/output fiber, it is difficult to reduce both the loss. For this reason, to extend the scale of a switch element, it is necessary not only to improve the yield by the improvement of the manufacturing process, but also to remarkably improve the element performance.

As a conventional art, there is also a configuration for spatially switching light. In this case, for example, if a reflection mirror is used as an optical path modifying element, there is no problem in performance, such as an on/off ratio, crosstalk and the like, which are problems in a waveguide type switch. However, since the volume of a switch increases, it is difficult to extend the scale from the viewpoint of size.

To break the deadlock, recently a semiconductor manufacturing technology for manufacturing this spatial switch in small size has been developed. This technology is called a "micro-electro-mechanical system (MEMS) and in particular the technology applied to the optical field is also called an "optical MEMS". According to this technology, a micromirror is manufactured on a substrate by a semiconductor manufacturing technology and desired input and output can be spatially coupled by three-dimensionally inclining this mirror by static electricity.

FIG. 1A shows a MEMS micro-mirror. The size of a round mirror 11 is approximately several hundred microns and the inclination of this mirror 11 is adjusted by the static electricity of four electrodes 12 around the mirror 11. Thus, the output direction of light reflected on the mirror 11 three-dimensionally changes and switching is performed.

Since this spatial switch uses a mirror, the switch is superior to a waveguide type switch in switching performance, and the size is also as small as that of the waveguide type switch. Since in this way, one-input/n-output switching can be spatially performed by such one movable mirror, as shown in FIG. 1B, this switch is called a "three-dimensional MEMS switch".

In FIG. 1B, a movable mirror 13 can output light from one input fiber 14 to one of n output fibers 15. In this case, mirror displacement parameters are two of $\theta_x$ representing the x-axis rotation angle of a mirror and $\theta_y$ representing they-axis rotation angle. By applying prescribed voltages $V_x$ and $V_y$ to the electrodes, the inclination angle of a mirror is changed by a predetermined amount, and switching is performed accordingly.

If a large angle displacement amount of this movable mirror cannot be secured, as shown in FIG. 1C, movable mirrors can also be located in two stages. In FIG. 1C, light from the input fiber 14 is reflected on a first-stage movable mirror 16 and is directed to a fixed mirror 17. The light reflected on the fixed mirror is directed to a second-stage movable mirror 18. Then, the light is reflected on the movable mirror 18 and is outputted from one of n output fibers 15. In this case, since the mirror displacement parameters of each movable mirror are two of $\theta_x$ and $\theta_y$, the total number of parameters becomes four.

If an n-input/n-output switch is configured, n and $2n$ movable mirrors are used in one-stage and two-stage types, respectively.

However, the conventional optical MEMS switch described above has the following problem.

The rigidity of a mirror used for switching varies depending on the ambient temperature and humidity. Due to this, the voltage-rotation angle characteristic of the mirror can change and an optical-coupling characteristic at the time of switching can degrade accordingly. The degradation of the optical-coupling characteristic includes the reduction of optical-coupling efficiency, crosstalk to another channel and the like.

The optical-coupling characteristic at the time of switching can also be degraded by the mechanical vibration of a mirror and the like. The degradation of an optical-coupling characteristic caused by such factors must be by any means compensated for.

SUMMARY OF THE INVENTION

It is an object of the present invention to provide a MEMS switch for compensating for the degradation of an optical-coupling characteristic in a node device constituting a photonic network.

The optical switch of the present invention comprises a mirror, the inclination angle of which varies depending on an application voltage, a driver device, an oscillation device, a superimposition device, a detection device and a control device. The driver device applies an application voltage to the mirror, and the oscillation device generates an additional signal of a prescribed frequency. The superimposition device superimposes the additional signal on the application voltage, and the detection device detects an signal component of the prescribed frequency from light reflected on the mirror. The control device performs control of the application voltage based on the detected signal component.

BRIEF DESCRIPTION OF THE DRAWINGS

FIG. 2 shows the basic configuration of an optical switch according to the present invention;

FIG. 7 shows the configuration of the second optical switch;

FIG. 12 shows the resonant vibration of a mirror;

DESCRIPTION OF THE PREFERRED EMBODIMENTS

Figure 1A:
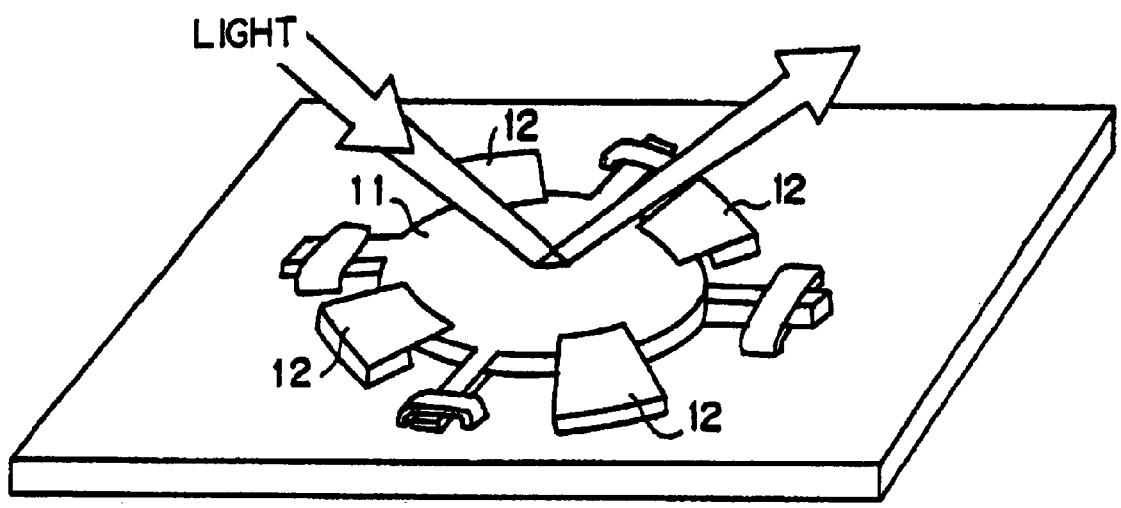
FIG. 1A shows a micro-mirror.
Figure 1B:
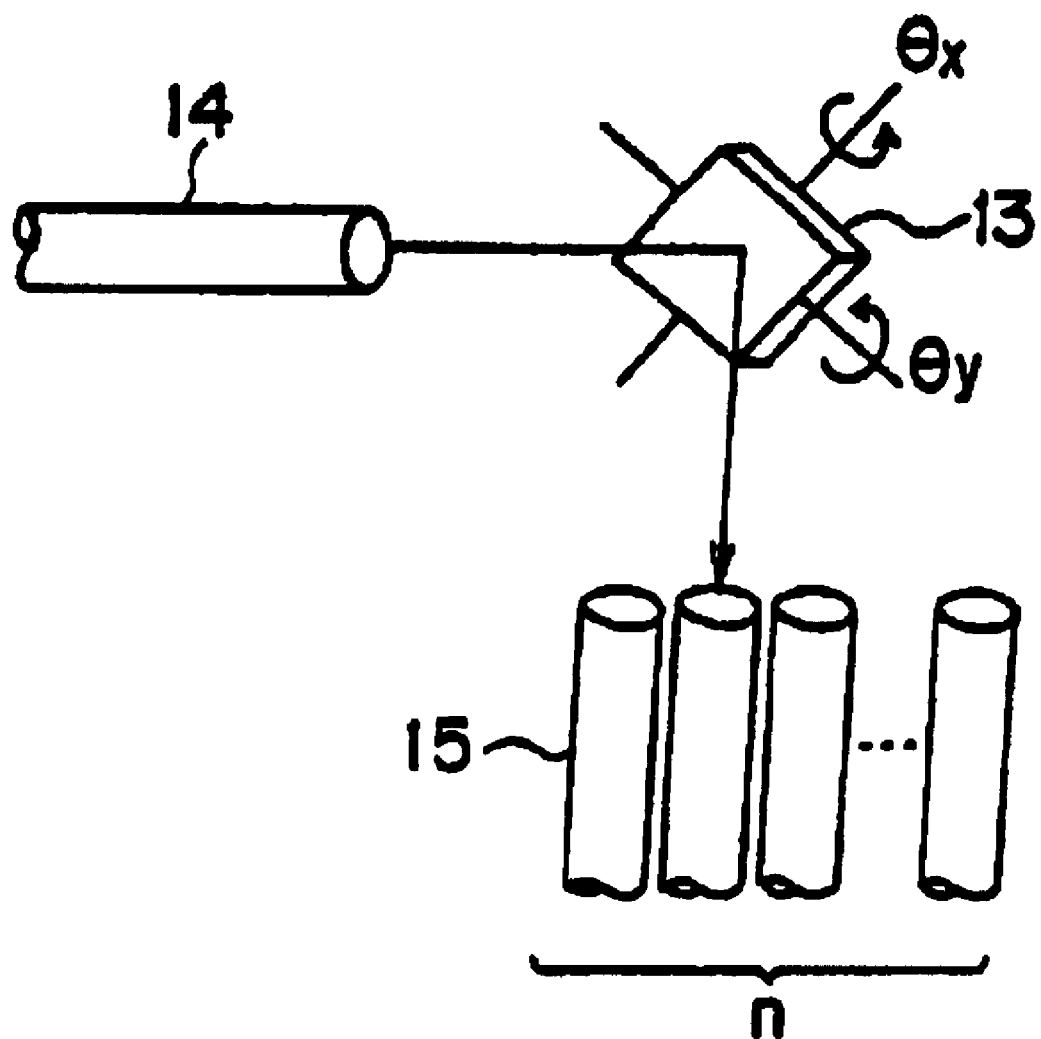
FIG. 1B shows the configuration of a one-stage type mirror configuration.

The preferred embodiments of the present invention are described in detail below with reference to the drawings.

FIG. 2 shows the basic configuration of an optical switch. The optical switch shown in FIG. 2 comprises a mirror 20, the inclination angle of which varies depending on an application voltage, a driver device 21, an oscillation device 22, a superimposition device 23, a detection device 24 and a control device 25.

The driver device 21 applies an application voltage to the mirror 20, and the oscillation device 22 generates an additional signal of a prescribed frequency. The superimposition device 23 superimposes the additional signal on the application voltage, and the detection device 24 detects a signal component of the prescribed frequency from light reflected on the mirror 20. The control device 25 performs control of the application voltage based on the detected signal component.

The mirror 20 corresponds to, for example, a MEMS micro-mirror. The mirror 20 reflects light and generates output light from the optical switch. The superimposition device 23 superimposes the additional signal generated by the oscillation device 22 to the application voltage outputted by the driver device 21. Then, the application voltage on which the additional signal is superimposed is applied to the mirror 20 to drive the mirror 20.

The light reflected on the mirror 20 includes a signal component of the additional signal frequency. This signal component is detected by the detection device 24 and is outputted to the control device 25. The control device 25 performs control of the driver device 21 in such a way that the application voltage can increase/decrease in accordance with the value of this signal component.

According to such an optical switch, the frequency component of the additional signal that appears in reflected light varies depending on the fluctuations of an optical-coupling characteristic. Thus, by increasing/decreasing an application voltage based on the change of this element, the fluctuations of the optical-coupling characteristic can be compensated for.

The driver device 21 shown in FIG. 2 corresponds to, for example, the driver circuit 46 shown in FIG. 5, which is described later, the driver/control circuits 63 and 64 shown in FIG. 7, which are described later, and the driver/control circuits 103, 104, 113 and 114, which are described later.

Figure 5:
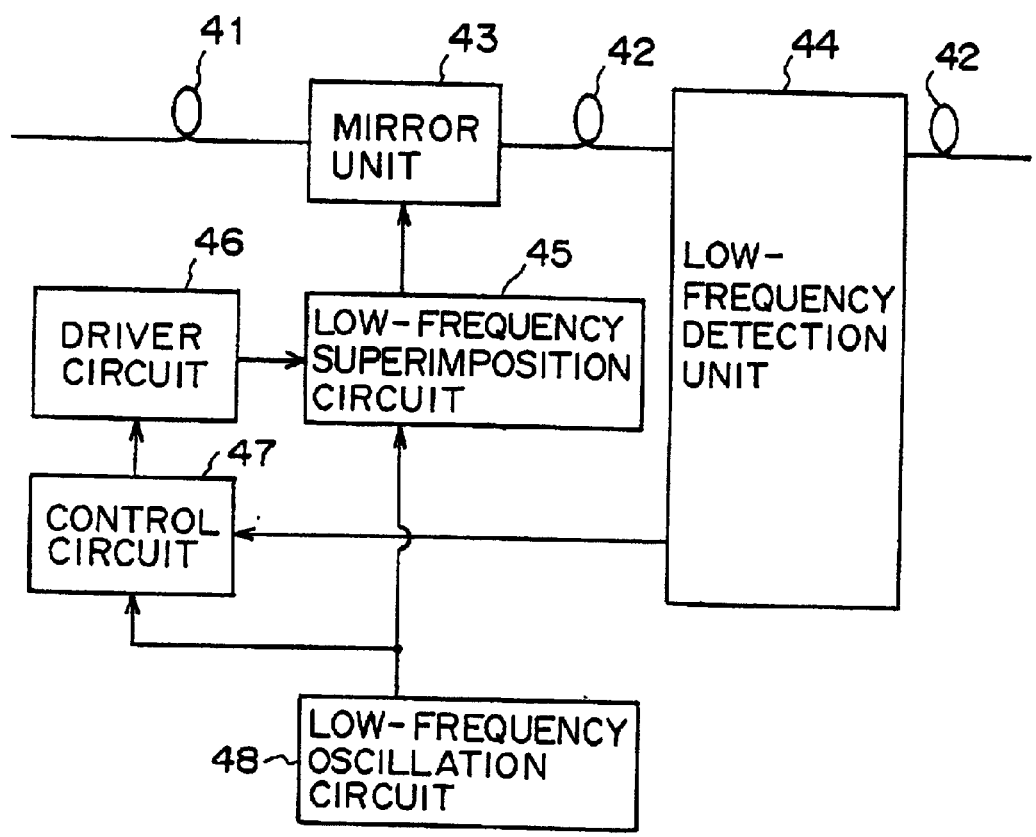
FIG. 5 shows the configuration of the first optical switch.
Figure 9:
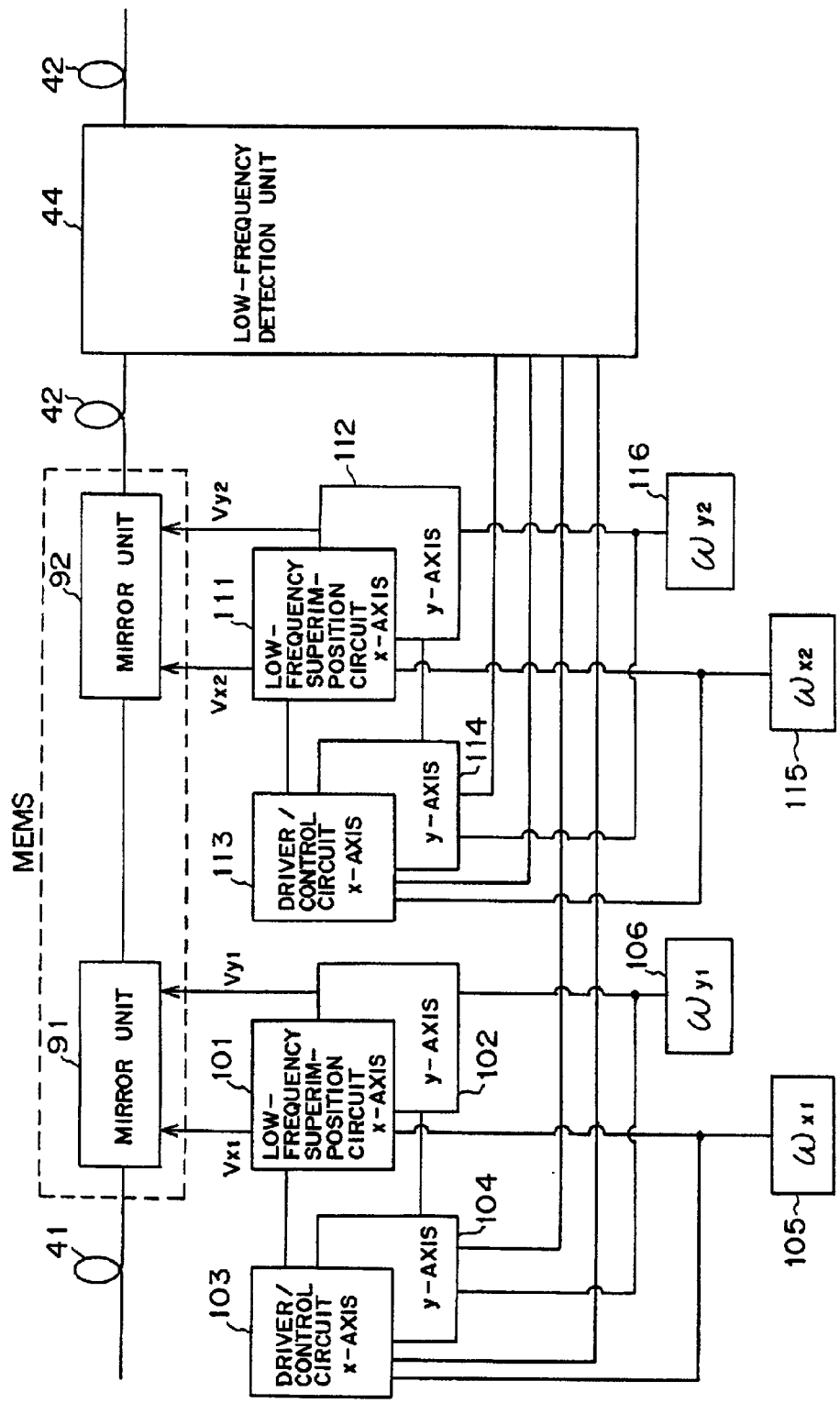
FIG. 9 shows the configuration of the third optical switch.

The oscillation device 22 shown in FIG. 2 corresponds to, for example, the low-frequency oscillation circuit 48 shown in FIG. 5, the low-frequency oscillation circuits 65 and 66 shown in FIG. 7 and the low-frequency oscillation circuits 105, 106, 115 and 116 shown in FIG. 9.

The superimposition device 23 shown in FIG. 2 corresponds to, for example, the low-frequency superimposition circuit 45 shown in FIG. 5, the low-frequency superimposition circuits 61 and 62 shown in FIG. 7 and the low-frequency superimposition circuits 101, 102, 111 and 112 shown in FIG. 9.

The detection device 24 shown in FIG. 2 corresponds to, for example, the low-frequency detection circuit 44. The control device 25 shown in FIG. 2 corresponds to, for example, the control circuit 47 shown in FIG. 5, the driver/control circuits 63 and 64 shown in FIG. 7, the driver/control circuits 103, 104, 113 and 114 shown in FIG. 9, and the digital control circuit 121 and external storage circuit 122 shown in FIG. 10, which is described later.

The optical-coupling efficiency η for each output fiber (channel) of a MEMS micro-switch can be expressed as follows.

$$\eta = \exp(-\pi^2 \cdot \theta^2 \cdot w^2 / \lambda^2) \qquad (1)$$

In the above equation, $\theta$ represents the deviation angle between a light beam reflected on a mirror and an output fiber, and is proportional to the deviation of the rotation angle of the mirror. w and $\lambda$ represents a beam radius and the wavelength of light, respectively.

Since the relation between the rotation angle of a mirror and a voltage applied to an electrode is almost linear, the relation between optical-coupling and a rotation angle can be replaced with the η-V characteristic of optical-coupling efficiency η and a MEMS driving voltage (application voltage) V. This η-V characteristic generally is a one-peak non-linear characteristic. Therefore, a prescribed voltage is applied so as to maximize this optical-coupling efficiency of each output fiber.

Figure 3:
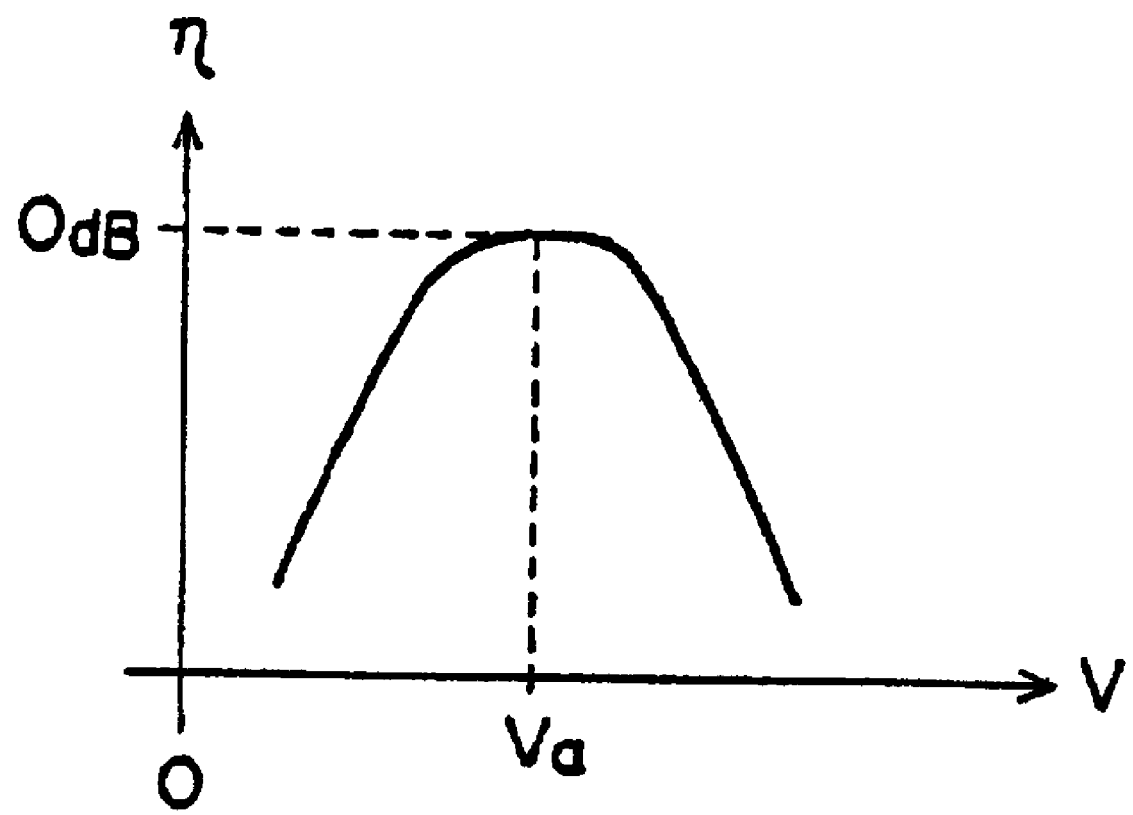
FIG. 3 shows an η-V characteristic.

FIG. 3 shows an η-V characteristic of an output fiber. In FIG. 3, the unit of η is decibel (dB) and η is the maximum when $V=V_a$. Therefore, if input light is switched to this output fiber, $V_a$ is applied to the electrode. Furthermore, in this preferred embodiment, to detect the drift (deviation) of the η-V characteristic and to compensate for the degradation of output light due to the drift, a low-frequency signal $V_c \cdot \cos(\omega t)$ is superimposed on $V_a$ as an additional signal.

Figure 4A:
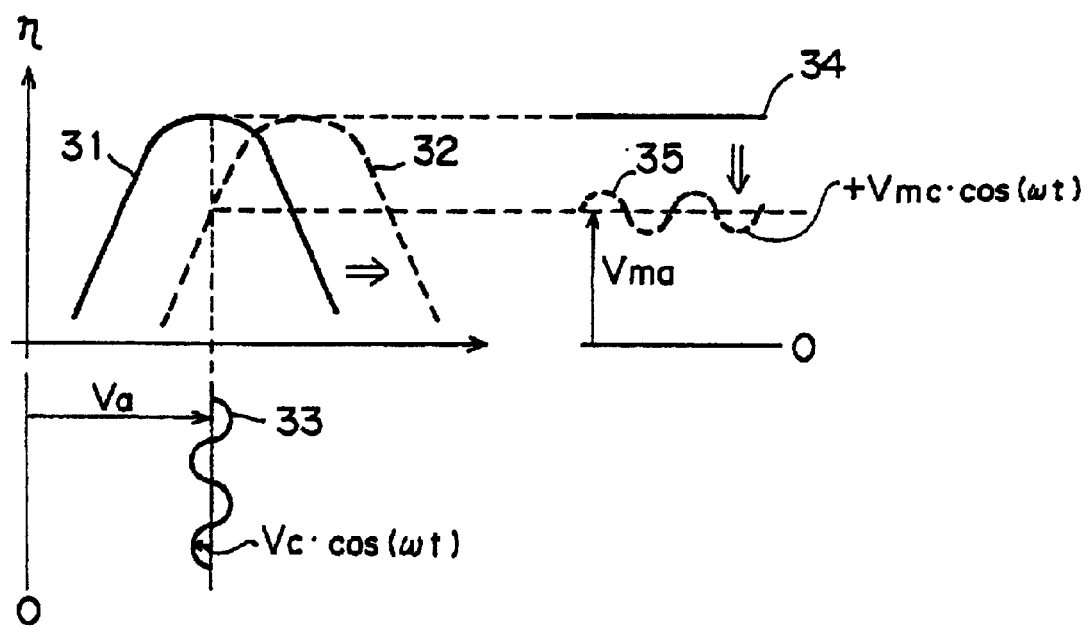
FIG. 4A shows drift in the positive direction.

FIG. 4A shows the relation between drift and output light in the case where a low-frequency signal is superimposed on an application voltage. First, as shown by a curve 31, if there is no drift in the η-V characteristic, no low-frequency component appears in an output light signal 34 for an application voltage 33 ($V_a + V_c \cdot \cos(\omega t)$) on which the low-frequency signal is superimposed.

Figure 4B:
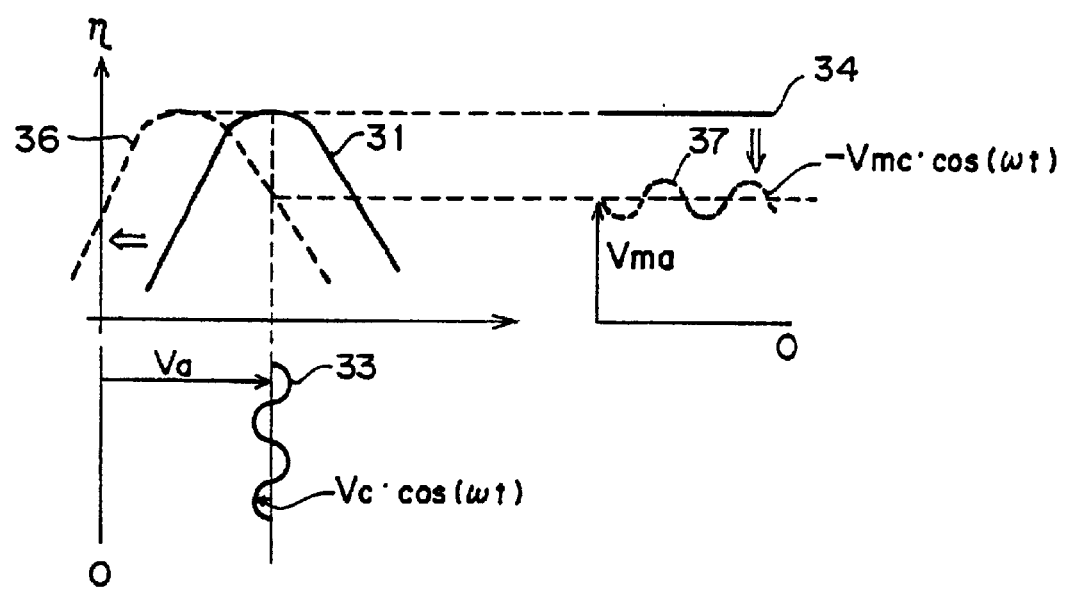
FIG. 4B shows drift in the negative direction.

However, if the η-V characteristic drifts in the positive direction (rightward) and a curve 32 is obtained, an output light signal 35 becomes $V_{ma} + V_{mc} \cdot \cos(\omega t)$ and an output light level decreases. Simultaneously, a low-frequency component of the same phase as that of the application voltage appears as a superimposed signal. As shown in FIG. 4B, if the η-V characteristic drifts in the negative direction (leftward) and a curve 36 is obtained, an output light signal 37 is $V_{ma}-V_{mc}\cdot\cos(\omega t)$ and a low-frequency component in opposite phase to the application voltage appears.

In this way, the phase of a low-frequency component appearing in output light varies depending on the drift direction. Therefore, the shift direction of an application voltage for restoring an optical-coupling efficiency to the original state can be determined by detecting the phase of this low-frequency component. In the case of drift in the positive direction, an application voltage should be increased. In the case of drift in the negative direction, the application voltage should be reduced.

Since the amount of the amplitude $V_{mc}$ of a low-frequency component varies depending on a drift amount, by detecting this amount, the shift amount of an application voltage can be obtained. By superimposing a signal of a prescribed frequency on an application voltage and detecting a component of the same frequency as that appearing in output light, the degradation of an optical-coupling characteristic due to drift can be compensated for.

FIG. 5 shows the configuration of an optical switch for performing such a compensation operation. The optical switch shown in FIG. 5 comprises optical paths 41 and 42, a mirror unit 43, a low-frequency detection unit 44, a low-frequency superimposition circuit 45, a driver circuit 46, a control circuit 47 and a low-frequency oscillation circuit 48.

The mirror unit 43 comprises a micro-mirror and electrodes, and optical paths 41 and 42 correspond to a path for the input light and a path for the output light, respectively, to and from a switch. The driver circuit 46 generates a prescribed application voltage for directing output light to a prescribed output fiber. The low-frequency oscillation circuit 48 oscillates a low-frequency signal of a prescribed frequency. The low-frequency superimposition circuit 45 superimposes the low-frequency signal from the low-frequency oscillation circuit 48 on the application voltage from the driver circuit 46 and applies the voltage to an electrode of the mirror unit 43.

The low-frequency detection unit 44 detects a low-frequency component in output light reflected on the mirror 43 and transfers the component to the control circuit 47. The control circuit 47 generates a control signal using both the received low-frequency component and the output signal of the low-frequency oscillation circuit 48 and outputs the control signal to the driver circuit 46. Then, the driver circuit 46 changes the application voltage based on the control signal.

The optical switch shown in FIG. 5 can be implemented by using an analog circuit and/or a digital circuit. If an analog circuit is used, for example, the circuit configuration shown in FIG. 6 can be obtained.

Figure 6:
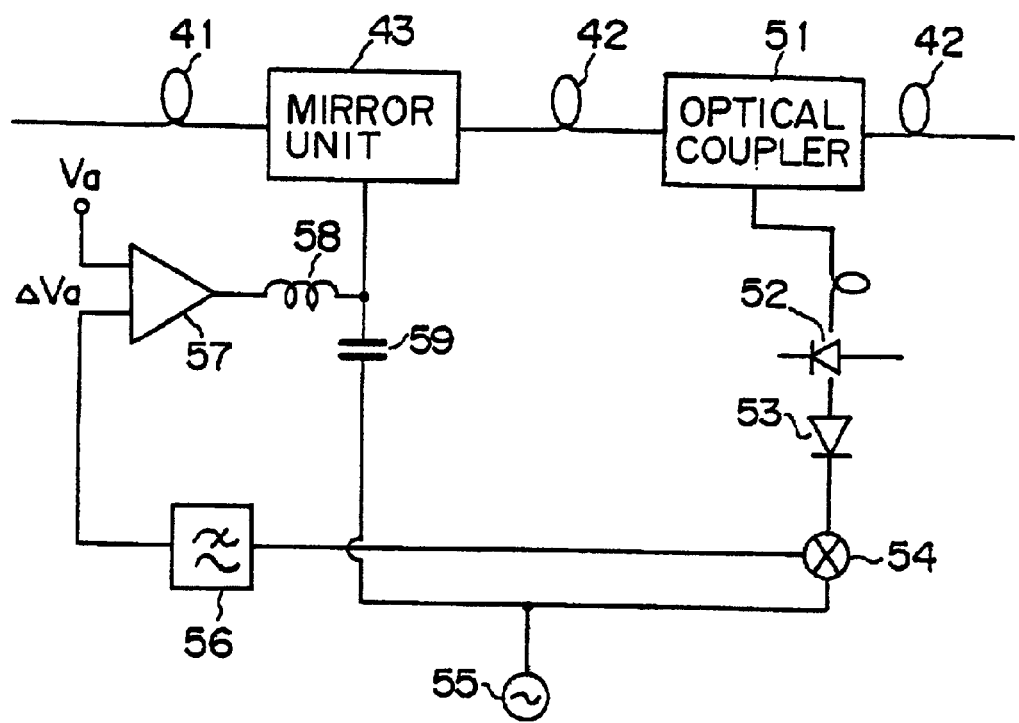
FIG. 6 shows the circuit of the first optical switch.

In FIG. 6, an optical coupler 51, a photo-diode 52 and an amplifier 53 correspond to the low-frequency detection unit 44 shown in FIG. 5. An oscillator 55 corresponds to the low-frequency oscillation circuit 48 shown in FIG. 5. A multiplier 54 (synchronous detector, etc.) and a low-pass filter 56 correspond to the control circuit 47 shown in FIG. 5. A differential amplifier 57 corresponds to the driver circuit 46 shown in FIG. 5, and a coil 58 and a capacitor 59 correspond to the low-frequency superimposition circuit 45 shown in FIG. 5.

The oscillator 55 generates a low-frequency signal of $V_c\cdot\cos(\omega t)$, and the differential amplifier 57 outputs application voltage $V_a$ in a state with no drift. The optical coupler 51 branches output light in the optical path 42, and the photo-diode 52 detects the signal of the branched light. Then, the amplifier 53 amplifies the detected signal and inputs the signal to the multiplier 54.

In this case, as shown in FIG. 4A, if an η-V characteristic drifts in the positive direction, the output of the amplifier 53 is $V_{ma}+V_{mc}\cdot\cos(\omega t)$. The multiplier 54 multiplies this signal by the output of the oscillator 55 to generate the following signal $V_M$.

$$V_M = \{V_{ma} + V_{mc}\cdot\cos(\omega t)\}\cdot V_c\cdot\cos(\omega t) \qquad (2)$$
$$= V_{ma}\cdot V_c\cdot\cos(\omega t) + V_{mc}\cdot V_c\cdot\cos^2(\omega t)$$
$$= V_{ma}\cdot V_c\cdot\cos(\omega t) + 0.5\cdot V_{mc}\cdot V_c + 0.5\cdot V_{mc}\cdot V_c\cdot\cos(2\omega t)$$

The low-pass filter 56 is designed so as to eliminate the AC component of the signal $V_M$ and to pass only the DC component, and outputs the DC voltage of $0.5\cdot V_{mc}\cdot V_c$. Similarly, as shown in FIG. 4B, if the η-V characteristic drifts in the negative direction, the DC voltage of $-0.5\cdot V_{mc}\cdot V$ is outputted from the low-pass filter 56. Then, the differential amplifier 57 generates application voltage $V_a+\Delta V_a$, by which the drift is compensated for, by comparing this DC voltage with originally applied $V_a$.

Since $V_{mc}$ can be considered to be almost proportional to the amount of drift, the absolute value of the output of the low-pass filter 56 is also proportional to the drift amount. Furthermore, if the direction of drift is positive, the output value becomes positive. If the direction is negative, the output becomes negative. Therefore, by controlling an application voltage using this value, the influence of drift can be compensated for.

The optical switch shown in FIG. 5 is configured so as to perform control of the rotation angle of one of two rotation axes of a mirror. However, if the optical switch simultaneously performs control of the respective rotation angles of two rotation axes, the configuration is as shown in FIG. 7. The optical switch shown in FIG. 7 comprises optical paths 41 and 42, a mirror unit 43, a low-frequency detection unit 44, low-frequency superimposition circuits 61 and 62, driver/control circuits 63 and 64 and low-frequency oscillation circuits 65 and 66. Each of the driver/control circuits 63 and 64 has the functions of both the driver circuit 46 and control circuit 47 that are shown in FIG. 5.

In this case, it is assumed that two mirror rotation axes of the mirror unit 43 are x-axis and y-axis and the rotation angles of these axes are $\theta_x$ and $\theta_y$, respectively. It is also assumed that the voltages for performing control of $\theta_x$ and $\theta_y$ are an x-axis electrode and a y-axis electrode, respectively, and the voltages applied to the electrodes are $V_x$ and $V_y$, respectively. The low-frequency superimposition circuit 61, driver/control circuit 63 and low-frequency oscillation circuit 65 adjust $V_x$ based on a signal from the low-frequency detection unit 44, and the low-frequency superimposition circuit 62, driver/control circuit 64 and low-frequency oscillation circuit 66 adjust $V_y$ based on a signal from the low-frequency detection unit 44.

Figure 8:
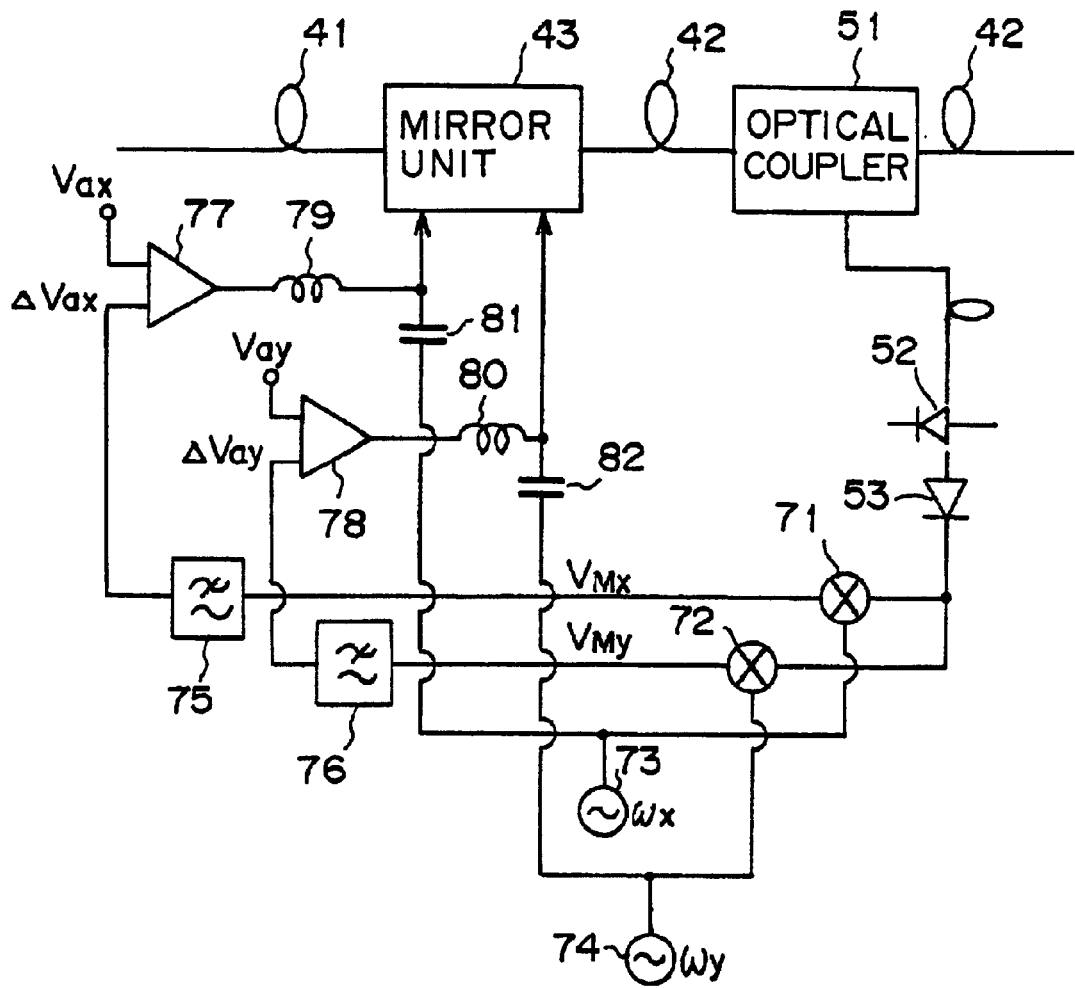
FIG. 8 shows the circuit of the second optical switch.

If the optical switch shown in FIG. 7 is configured by an analog circuit, the configuration, for example, as shown in FIG. 8 is obtained. In FIG. 8, oscillators 73 and 74 correspond to the low-frequency oscillation circuits 65 and 66. A multiplier 71, a low-pass filter 75 and a differential amplifier 77 correspond to the driver/control circuit 63 shown in FIG. 7, and a multiplier 72, a low-pass filter 76 and a differential amplifier 78 correspond to the driver/control circuit 64 shown in FIG. 7. A coil 79 and a capacitor 81 correspond to the low-frequency superimposition circuit 61 shown in FIG. 7, and a coil 80 and a capacitor 82 correspond to the low-frequency superimposition circuit 62 shown in FIG. 7.

The oscillators 73 and 74 generate low-frequency signals of $V_{cx}\cdot\cos(\omega_x t)$ and $V_{cy}\cdot\cos(\omega_y t)$, respectively, and the differential amplifiers 77 and 78 output application voltages $V_{ax}$ and $V_{ay}$, respectively, in a state with no drift.

In this case, if both η-V characteristics of the x-axis and y-axis drift, two low-frequency components of $\omega_x$ and $\omega_y$ are superimposed on and appear in output light. Therefore, the output of the amplifier 53 is $V_{ma}+V_{mcx}\cdot\cos(\omega_x t)+V_{mcy}\cdot\cos(\omega_y t)$. However, $V_{ma}$ is an output value obtained when $V_x=V_{ax}$ and $V_y=V_{ay}$. The multiplier 71 multiplies this signal by the output of the oscillator 73 to generate the following signal.

$$V_{Mx} = \{V_{ma} + V_{mcx} \cdot \cos(\omega_x t) + V_{mcy} \cdot \cos(\omega_y t)\} \cdot V_{cx} \cdot \cos(\omega_x t) \quad (3)$$

$$= V_{ma} \cdot V_{cx} \cdot \cos(\omega_x t) + V_{mcx} \cdot V_{cx} \cdot \cos^2(\omega_x t) +$$

$$V_{mcy} \cdot V_{cx} \cdot \cos(\omega_x t) \cdot \cos(\omega_y t)$$

$$= 0.5 \cdot V_{mcx} \cdot V_{cx} + 0.5 \cdot V_{mcx} \cdot V_{cx} \cdot \cos(2\omega_x t) +$$

$$V_{ma} \cdot V_{cx} \cdot \cos(\omega_x t) + 0.5 \cdot V_{mcy} \cdot V_{cx} \cdot \cos((\omega_x + \omega_y)t) +$$

$$0.5 \cdot V_{mcy} \cdot V_{cx} \cdot \cos((\omega_x - \omega_y)t)$$

If this $V_{MX}$ passes through the low-pass filter 75, the AC component is eliminated and the DC component of $0.5 \cdot V_{mcx} \cdot V_{cx}$ is obtained. This value is regarded to be proportional to the drift amount of the x-axis η-V characteristic and becomes positive/negative corresponding to the positive/negative direction of the drift. The differential amplifier 77 generates application voltage $V_{ax}+\Delta V_{ax}$, by which the drift is compensated for, by comparing this DC voltage with $V_{ax}$.

Similarly, the multiplier 72 produces signal $V_{My}$ by multiplying the output of the amplifier 53 by the output of the oscillator 74, and the low-pass filter 76 outputs a DC voltage corresponding to drift on the y-axis. Then, the differential amplifier 78 generates application voltage $V_{ay}+\Delta V_{ay}$, by which the drift is compensated for, by comparing this DC voltage with $V_{ay}$.

Figure 1C:
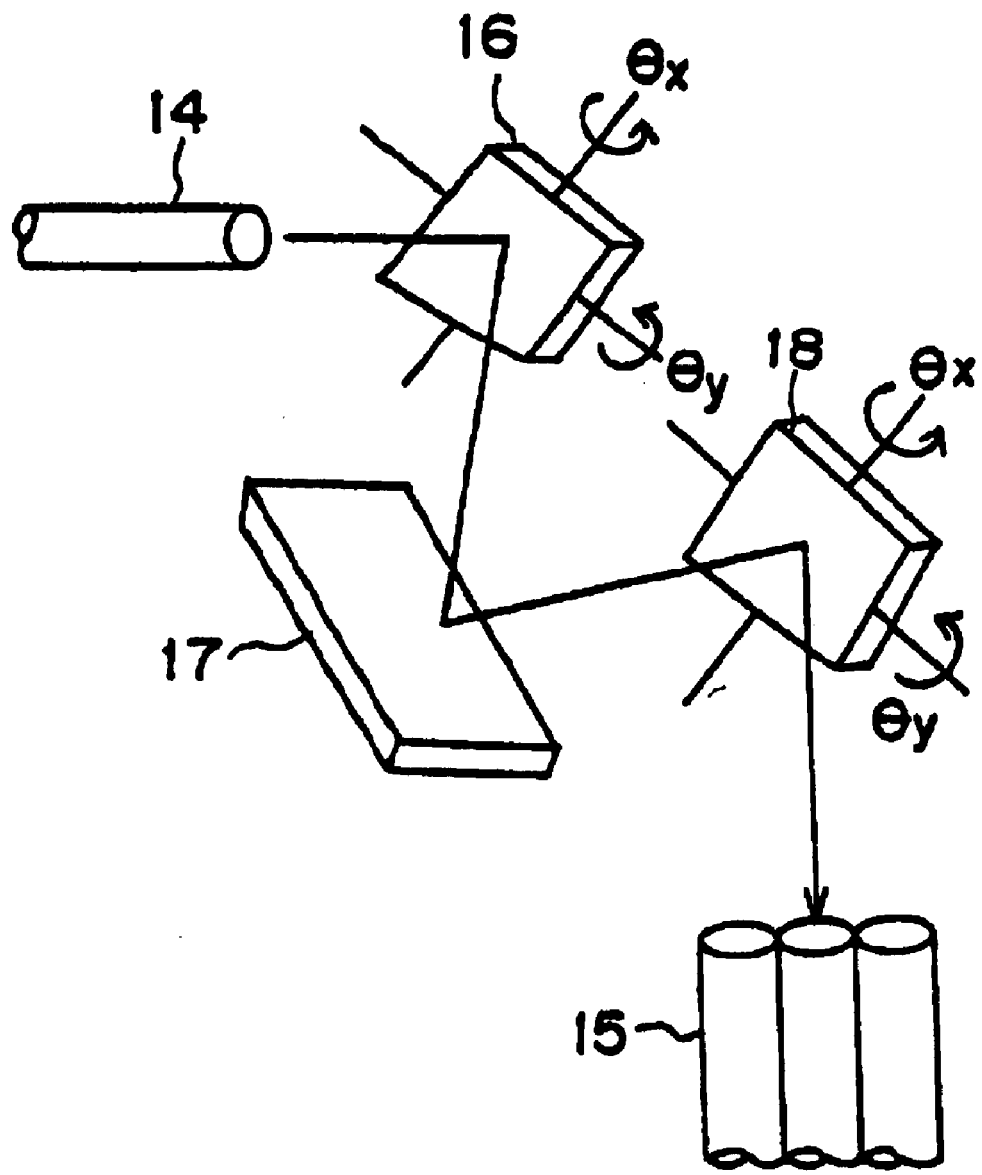
FIG. 1C shows the configuration of a two-stage type mirror configuration.

According to such a control method, when the number of parameters to be controlled increases, it is sufficient to prepare so many low-frequency oscillation circuits of different frequencies, driver/control circuits and low-frequency superimposition circuits in accordance with the number of the parameters. For example, in the case of a switch cell of two-stage mirror configuration as shown in FIG. 1C, it is sufficient that the same circuits as those shown in FIG. 7 are provided in each of the former- and latter-stage mirror units.

FIG. 9 shows the configuration of such an optical switch of two-stage mirror configuration. The optical switch shown in FIG. 9 comprises optical paths 41 and 42, a low-frequency detection unit 44, mirror units 91 and 92, low-frequency superimposition circuits 101, 102, 111 and 112, driver/control circuits 103, 104, 113 and 114 and low-frequency oscillation circuits 105, 106, 115 and 116.

In this case, the respective rotations of the x-axis and y-axis of the former-stage mirror unit 91 are controlled by application voltages $V_{x1}$ and $V_{y1}$, respectively, and the respective rotations of the x-axis and y-axis of the latter-stage mirror unit 92 are controlled by application voltages $V_{x2}$ and $V_{y2}$, respectively. The low-frequency oscillation circuits 105, 106, 115 and 116 generate low-frequency signals of frequencies $\omega_{x1}$, $\omega_{y1}$, $\omega_{x2}$ and $\omega_{y2}$, respectively, and the low-frequency detection circuit 44 detects these four low-frequency components. If this optical switch is configured by an analog circuit, a similar configuration to that shown in FIG. 8 is obtained.

Although in FIGS. 6 and 8, configurations by an analog circuit are shown, a digital circuit can also be added to the control circuit 47 shown in FIG. 5, the driver/control circuits 63 and 64 shown in FIG. 7 or the driver/control circuits 103, 104, 113 and 114.

Figure 10:
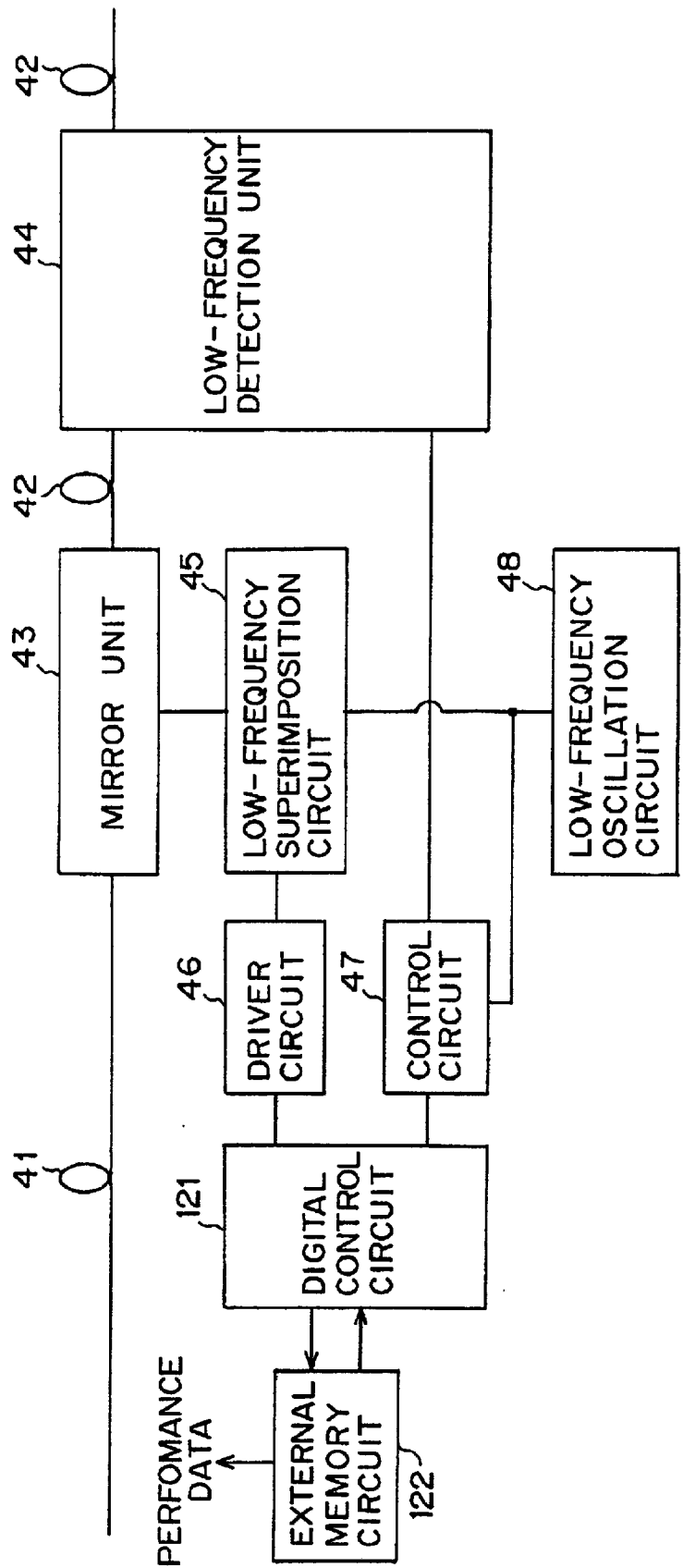
FIG. 10 shows the configuration of the fourth optical switch.

FIG. 10 shows the configuration in which a digital circuit is added to the optical switch shown in FIG. 5. The optical switch shown in FIG. 10 further comprises a digital control circuit 121 and an external memory circuit 122 in addition to the configuration shown in FIG. 5.

The digital control circuit 121 converts an analog voltage from the control circuit 47 into a digital signal and generates a control signal by a prescribed operation. Then, the circuit 121 converts the control signal into an analog voltage and inputs the voltage to the driver circuit 46. Further, the digital control circuit 121 writes the respective values of application voltage $V_a$ and optical-coupling efficiency η in the external memory circuit 122 in a predetermined cycle. Then, the external memory circuit 122 notifies a device control unit of a node device of those values of the parameters as performance data.

The state of the optical MEMS switch can be estimated by monitoring these two parameters. For example, if η is kept constant and only $V_a$ gradually increases or decreases, the electrode portion of the MEMS may be degraded. In this case, it is supposed that a required application voltage will exceed the control range sooner or later.

Therefore, the threshold (an upper limit and a lower limit) of this value is set in the device control unit and if the threshold value is reached, the device control unit issues a critical alarm. Thus, a user can exchange the electrodes before the electrodes are thoroughly degraded. Contrary, if only η decreases, the optical-coupling portion may be degraded. In this case too, similarly, exchange is possible before degradation by determining the threshold for issuing an alarm.

Figure 11:
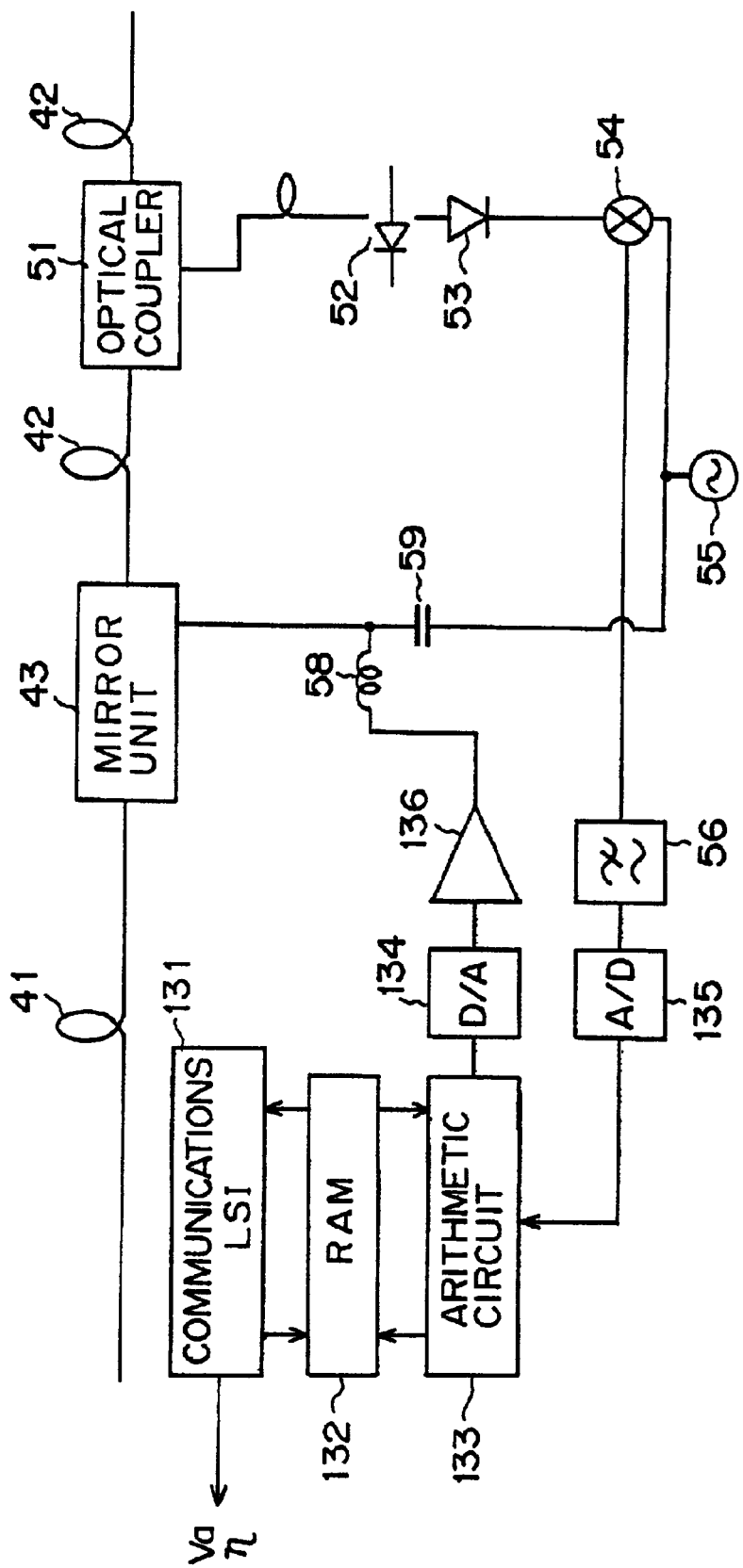
FIG. 11 shows the circuit of the fourth optical switch.

FIG. 11 shows one circuit configuration of the optical switch shown in FIG. 10. The same numerals of the constituent elements shown in FIG. 11 as those shown in FIG. 6 represent the same constituent elements shown in FIG. 6. A communications LSI (Large-Scale Integration) 131 and a RAM (Random-Access Memory) 132 correspond to the external memory circuit 122 shown in FIG. 10, and an arithmetic circuit 133, a D/A (digital-to-analog) conversion circuit 134 and an A/D (analog-to-digital) conversion circuit 135 correspond to the digital control circuit 121 shown in FIG. 10. An amplifier 136 corresponds to the driver circuit 46 shown in FIG. 10.

The A/D conversion circuit 135 converts the output of the low-pass filter 56 into a digital signal and outputs the signal to the arithmetic circuit 133. The arithmetic circuit 133 calculates an application voltage for compensating for drift based on the inputted signal and outputs a signal corresponding to the voltage value to the D/A conversion circuit 134. The D/A conversion circuit 134 converts the inputted signal into an analogue signal and outputs the signal to the amplifier 136. The amplifier amplifies the signal.

The arithmetic circuit 133 calculates the respective values of both $V_a$ and η, and writes the values in the RAM 132, and the communications LSI 131 notifies the device control unit of the data stored in the RAM 132. A parameter representing optical-coupling loss can be used instead of η. In the case where a digital circuit is added to the driver/control circuits shown in FIG. 7 or 9, the configuration is similar to that shown in FIG. 10.

By the way, since a movable mirror is used for an optical switch, as shown in FIG. 12, there is a possibility of causing resonant vibration. If a completely free round plate is used as a model of a movable mirror, the resonance frequency fr can be expressed as follows.

$$fr=(\lambda_2 h/2/\pi/a^2)\cdot((E/3/(1-V^2)/\rho)^{0.5}) \quad (4)$$

In the above equation, $\lambda$, h, a, E, V and $\rho$ are a mode parameter, thickness, a radius, Young's modulus, a Poisson's ratio and material density, respectively. For example, if $\lambda=3.2$ (in the case of a basic mode), h=1 $\mu$m, a=150 $\mu$m, $E=150\times10^9$ N/m$^2$, V=approximately 0.3 and $\rho=2\times10^3$ kg/m$^3$ (in the case of silicon (Si)), fr=260 KHz (cycle: 4 $\mu$sec.). Since mirrors are actually fixed in four places, the resonance frequency will be higher and be in order of MHz.

If this resonance occurs, optical-coupling efficiency vibrates with a resonance frequency, and the quality of output light is degraded. Since the mirror's inclination due to resonance is equivalent to the drift of the $\eta$-V characteristic described above, the influence of the resonant vibration can be compensated for by the control method using the low-frequency signal described above.

However, if the frequency of a low-frequency signal to be superimposed is lower than a resonance frequency, there is no control, and the start of control delays accordingly. Therefore, the frequency of a low-frequency signal is set higher than a resonance frequency, and simultaneously the circuit is configured in such a way that the time constant of the control system will be small. Thus, high-accuracy control is available.

According to the present invention, in an optical MEMS switch used in a photonic network, the degradation of an optical-coupling characteristic can be compensated for.

What is claimed is:

1. An optical switch, comprising:
   a mirror, an inclination angle of which varies depending on an application voltage;
   a driver device applying the application voltage to the mirror;
   an oscillation device generating an additional signal of a prescribed frequency;
   a superimposition device superimposing the additional signal on the application voltage;
   a detection device detecting a signal component of the prescribed frequency which appears in light reflected on the mirror when the application voltage is applied to the mirror; and
   a control device multiplying the detected signal component by the additional signal from said oscillation device to obtain a resulting signal and extracting a DC component from the resulting signal, said driver device receiving the DC component from said control device and changing the application voltage by using the DC component.

2. The optical switch according to claim 1, further comprising:
   a storage device storing at least one of information about the application voltage and information about optical-coupling efficiency of the optical switch; and
   a notification device notifying a prescribed notification addressee of the information stored in the storage device.

3. The optical switch according to claim 1, wherein said oscillation device generates an additional signal of a frequency higher than a mechanical resonance frequency of said mirror.

4. An optical switch, comprising:
   a mirror, an inclination angle in a first direction of which varies depending on a first application voltage and an inclination angle in a second direction of which varies depending on a second application voltage;
   a first driver device applying the first application voltage to the mirror;
   a second driver device applying the second application voltage to the mirror;
   a first oscillation device generating a first additional signal of a first frequency;
   a second oscillation device generating a second additional signal of a second frequency;
   a first superimposition device superimposing the first additional signal on the first application voltage;
   a second superimposition device superimposing the second additional signal on the second application voltage;
   a detection device detecting respective signal components of the first and second frequencies which appear in light reflected on the mirror when the first and second application voltages are respectively applied to the mirror;
   a first control device multiplying the respective signal components of the first and second frequencies by the first additional signal from said first oscillation device to obtain a first resulting signal and extracting a first DC component from the first resulting signal, said first driver device receiving the first DC component from said first control device and changing the first application voltage by using the first DC component; and
   a second control device multiplying the respective signal components of the first and second frequencies by the second additional signal from said second oscillation device to obtain a second resulting signal and extracting a second DC component from the second resulting signal, said second driver device receiving the second DC component from said second control device and changing the second application voltage by using the second DC component.

5. An optical switch, comprising:
   a former-stage mirror, an inclination angle in a first direction of which varies depending on a first application voltage and an inclination angle in a second direction of which varies depending on a second application voltage;
   a latter-stage mirror, an inclination angle in a third direction of which varies depending on a third application voltage and an inclination angle in a fourth direction of which varies depending on a fourth application voltage;
   a first driver device applying the first application voltage to the former-stage mirror;
   a second driver device applying the second application voltage to the former-stage mirror;
   a first oscillation device generating a first additional signal of a first frequency;
   a second oscillation device generating a second additional signal of a second frequency;
   a first superimposition device superimposing the first additional signal on the first application voltage;
   a second superimposition device superimposing the second additional signal on the second application voltage;
   a third driver device applying the third application voltage to the latter-stage mirror;
   a fourth driver device applying the fourth application voltage to the latter-stage mirror;
   a third oscillation device generating a third additional signal of a third frequency;

a fourth oscillation device generating a fourth additional signal of a fourth frequency;

a third superimposition device superimposing the third additional signal on the third application voltage;

a fourth superimposition device superimposing the fourth additional signal on the fourth application voltage;

a detection device detecting respective signal components of the first, second, third and fourth frequencies which appear in light reflected on the latter-stage mirror when the first and second application voltages are respectively applied to the former-stage mirror and the third and fourth application voltages are respectively applied to the latter-stage mirror; and a first control device multiplying the respective signal components of the first, second, third and fourth frequencies by the first additional signal from said first oscillation device to obtain a first resulting signal and extracting a first DC component from the first resulting signal, said first driver device receiving the first DC component from said first control device and changing the first application voltage by using the first DC component;

a second control device multiplying the respective signal components of the first, second, third, and fourth frequencies by the second additional signal from said second oscillation device to obtain a second resulting signal and extrating a second DC component from the second resulting signal, said second driver device receiving the second DC component from said second control device and changing the second application voltage by using the second DC component;

a third control device multiplying the respective signal components of the first, second, third, and fourth frequencies by the third additional signal from said third oscillation device to obtain a third resulting signal and extracting a third DC component from the third resulting signal, said third driver device receiving the third DC component from said third control device and changing the third application voltage by using the third DC component; and a fourth control device multiplying the respective signal components of the first, second, third, and fourth frequencies by the fourth additional signal from said fourth oscillation device to obtain a fourth resulting signal and extracting a fourth DC component from the fourth resulting signal, said fourth driver device receiving the fourth DC component from said fourth control device and changing the fourth application voltage by using the fourth DC component.

6. A control device for an optical switch with a mirror, an inclination angle of which varies depending on an application voltage, comprising:

a driver device applying the application voltage to the mirror;

an oscillation device generating an additional signal of a prescribed frequency;

a superimposition device superimposing the additional signal on the application voltage;

a detection device detecting a signal component of the prescribed frequency which appears in light reflected on the mirror when the application voltage is applied to the mirror; and a control device multiplying the detected signal component by the additional signal from said oscillation device to obtain a resulting signal and extracting a DC component from the resulting signal, said driver device receiving the DC component from said control device and changing the application voltage by using the DC component.

7. A control device for an optical switch with a mirror, an inclination angle in a first direction of which varies depending on a first application voltage and an inclination angle in a second direction of which varies depending on a second application voltage, comprising:

a first driver device applying the first application voltage to the mirror;

a second driver device applying the second application voltage to the mirror;

a first oscillation device generating a first additional signal of a first frequency;

a second oscillation device generating a second additional signal of a second frequency;

a first superimposition device superimposing the first additional signal on the first application voltage;

a second superimposition device superimposing the second additional signal on the second application voltage;

a detection device detecting respective signal components of the first and second frequencies which appear in light reflected on the mirror when the first and second application voltages are respectively applied to the mirror;

a first control device multiplying the respective signal components of the first and second frequencies by the first additional signal from said first oscillation device to obtain a first resulting signal and extracting a first DC component from the first resulting signal, said driver device receiving the first DC component from said control device and changing the first application voltage by using the first DC component; and a second control device multiplying the respective signal components of the first and second frequencies by the second additional signal from said second oscillation device to obtain a second resulting signal and extracting a second DC component from the second resulting signal, said second driver device receiving the second DC component from said second control device and changing the second application voltage by using the second DC component.

8. A control device for an optical switch with both a former-stage mirror, an inclination angle in a first direction of which varies depending on a first application voltage and an inclination angle in a second direction of which varies depending on a second application voltage, and a latter-stage mirror, an inclination angle in a third direction of which varies depending on a third application voltage and an inclination angle in a fourth direction of which varies depending on a fourth application voltage, comprising:

a first driver device applying the first application voltage to the former-stage mirror;

a second driver device applying the second application voltage to the former-stage mirror;

a first oscillation device generating a first additional signal of a first frequency;

a second oscillation device generating a second additional signal of a second frequency;

a first superimposition device superimposing the first additional signal on the first application voltage;

a second superimposition device superimposing the second additional signal on the second application voltage;

a third driver device applying the third application voltage to the latter-stage mirror;

a fourth driver device applying the fourth application voltage to the latter-stage mirror;

a third oscillation device generating a third additional signal of a third frequency;

a fourth oscillation device generating a fourth additional signal of a fourth frequency;

a third superimposition device superimposing the third additional signal on the third application voltage;

a fourth superimposition device superimposing the fourth additional signal on the fourth application voltage;

a detection device detecting respective signal components of the first, second, third and fourth frequencies which appear in light reflected on the latter-stage mirror when the first and second application voltages are respectively applied to the former-stage mirror and the third and fourth application voltages are respectively applied to the latter-stage mirror;

a first control device multiplying the respective signal components of the first, second, third, and fourth frequencies by the first additional signal from said first oscillation device to obtain a first resulting signal and extracting a first DC component from the first resulting signal, said first driver device receiving the first DC component from said first control device and changing the first application voltage by using the first DC component;

a second control device multiplying the respective signal components of the first, second, third, and fourth frequencies by the second additional signal from said second oscillation device to obtain a second resulting signal and extracting a second DC component from the second resulting signal, said second driver device receiving the second DC component from said second control device and changing the second application voltage by using the second DC component;

a third control device multiplying the respective signal components of the first, second, third, and fourth frequencies by the third additional signal from said third oscillation device to obtain a third resulting signal and extracting a third DC component from the third resulting signal, said third driver device receiving the third DC component from said third control device and changing the third application voltage by using the third DC component; and a fourth control device multiplying the respective signal components of the first, second, third, and fourth frequencies by the fourth additional signal from said fourth oscillation device to obtain a fourth resulting signal and extracting a fourth DC component from the fourth resulting signal, said fourth driver device receiving the fourth DC component from said fourth control device and changing the fourth application voltage by using the fourth DC component.

9. An optical switch, comprising:

a mirror, an inclination angle of which varies depending on an application voltage;

driver means for applying the application voltage to the mirror;

oscillation means for generating an additional signal of a prescribed frequency;

superimposition means for superimposing the additional signal on the application voltage;

detection means for detecting a signal component of the prescribed frequency which appears in light reflected on the mirror when the application voltage is applied to the mirror; and control means for multiplying the respective signal components by the additional signal from said oscillation means to obtain a resulting signal and extracting a DC component from the resulting signal, said driver means receiving the DC component from said control means and changing the application voltage by using the DC component.

* * * * *

UNITED STATES PATENT AND TRADEMARK OFFICE
CERTIFICATE OF CORRECTION

PATENT NO. : 6,813,410 B2
APPLICATION NO. : 09/986027
DATED : November 2, 2004
INVENTOR(S) : Yoichi Oikawa It is certified that error appears in the above-identified patent and that said Letters Patent is hereby corrected as shown below:

Column 11, line 28, change "extrating" to --extracting--

Signed and Sealed this

Third Day of October, 2006

JON W. DUDAS
*Director of the United States Patent and Trademark Office*